United States Patent
Hase et al.

[15] 3,659,869
[45] May 2, 1972

[54] CONSTRUCTION OF A STEERING KNUCKLE BEARING FOR THE LUBRICATION BY MEANS OF LUBRICATING OIL

[72] Inventors: Helmut Hase; Egbert Siwik, both of Gaggenau, Baden, Germany

[73] Assignee: Daimler-Benz Aktiengesellschaft, Stuttgart-Unterturkhein, Germany

[22] Filed: Nov. 26, 1969

[21] Appl. No.: 880,150

[30] Foreign Application Priority Data

Nov. 27, 1968 Germany................P 18 11 092.4

[52] U.S. Cl.............................280/96.1, 184/7 E, 308/120 A
[51] Int. Cl................................................B62d 7/18
[58] Field of Search.............280/96.1, 96.3; 308/120, 120 A, 308/120 B; 184/7 E, 105

[56] References Cited

UNITED STATES PATENTS

| | | | |
|---|---|---|---|
| 1,503,511 | 8/1924 | Masury | 280/96.1 |
| 1,881,945 | 10/1932 | Raisch | 308/120 A X |
| 2,009,429 | 7/1935 | Bijur | 280/96.1 X |
| 2,241,820 | 5/1941 | Köhn | 308/120 X |
| 2,615,765 | 10/1952 | Venable | 280/96.1 X |
| 3,336,089 | 8/1967 | Krickler | 308/120 X |

FOREIGN PATENTS OR APPLICATIONS 500,025 5/1930 Germany..................184/7 C

*Primary Examiner*—Benjamin Hersh
*Assistant Examiner*—John P. Silverstrim
*Attorney*—Craig, Antonelli and Hill

[57] ABSTRACT

An axle spindle bearing assembly which includes a lower and an upper bearing connected with each other by a bore system provided in the axle spindle bolt while a reservoir space connected to the bore system is arranged in the axle spindle bolt within the area of the upper bearing which is in communication with the section of the bore system leading to the lower bearing, for example, by way of a return checking device.

19 Claims, 1 Drawing Figure

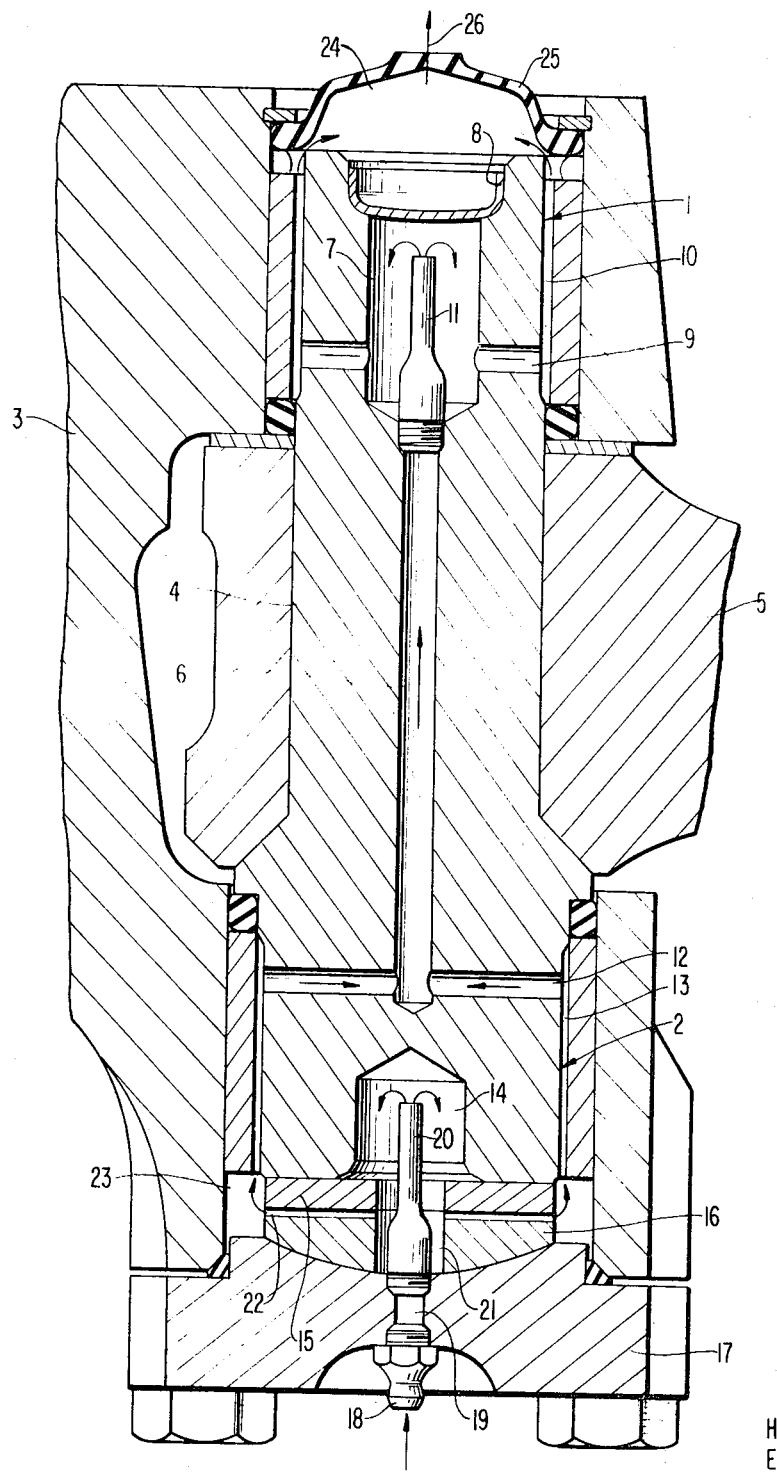

CONSTRUCTION OF A STEERING KNUCKLE BEARING FOR THE LUBRICATION BY MEANS OF LUBRICATING OIL

The present invention relates to the construction of an axle spindle bearing assembly such as a steering knuckle bearing or king pin bearing for the lubrication with lubricating oil and aims at realizing the construction in such a manner that a through-lubrication is possible and thereafter a lubricating oil supply is present which is available for the automatic re-lubrication.

The underlying problems are solved in accordance with the present invention in that the upper and lower bearing of the axle spindle bearing assembly such as the steering knuckle bearing are connected with each other by a bore system provided in the axle spindle bolt, such as the steering knuckle bolt, and in that a reservoir space connected to the bore system is arranged within the area of the upper bearing which is in communication by way of a return-flow checking device with the portion of the bore system leading to the lower bearing.

A permanent lubrication of the upper bearing with lubricating oil is achieved by the reservoir space provided with the return-flow checking device in the axle spindle bolt such as the steering swivel bolt or king pin. However, also the lower bearing receives a permanent lubrication with lubricating oil because the bore system in the axle spindle bolt such as the steering swivel or king pin below the reservoir space provided with the return-flow checking device acts as reservoir space.

According to a further development and feature of the inventive subject matter, the bore system may consist of a central bore, which is enlarged within the area of the upper bearing into the reservoir or storage space that is connected by way of radial bores with the lower area of the upper bearing, and with which are connected radial bores within the area of the lower bearing that lead to the upper area of the lower bearing.

In a simple manner, the return-flow checking device may consist of a tube extending into the supply space or reservoir.

Within the lower area of the lower bearing, a lower supply or reservoir space may be arranged underneath the central bore which is connected by way of lubricating gaps or the like with the lower area of the lower bearing and to which leads a bore closed by a lubricating nipple.

The bore closed by the lubricating nipple may be extended by a tube projecting into the lower reservoir space as return-flow checking device.

An equalization space in communication with the upper area of the upper bearing may be arranged above the upper reservoir space which is provided with an excess pressure valve discharging into the atmosphere. The equalization space may thereby be covered in an advantageous manner by a rubber cap and the excess pressure valve may be constituted by a bore in the rubber cap which opens under excess pressure.

Accordingly, it is an object of the present invention to provide an axle spindle bearing assembly of the aforementioned type which avoids the shortcomings and drawbacks described above and encountered in the prior art.

Another object of the present invention resides in a king-pin or steering-knuckle bearing which permits an externally applied through-lubrication as well as automatic re-lubrication.

A further object of the present invention resides in a lubricating system for a king-pin bearing assembly which is simple in construction and reliable in operation to assure adequate lubrication under all conditions.

These and further objects, features, and advantages of the present invention will become more obvious from the following description when taken in connection with the accompanying drawing which shows, for purposes of illustration only, one embodiment in accordance with the present invention, and wherein:

The single FIGURE is a longitudinal axial cross-sectional view through an axle spindle bearing in accordance with the present invention.

Referring now to the single figure of the drawing, reference numeral 1 generally designates therein the upper bearing and reference numeral 2 generally designates the lower bearing of the bearing support of the axle spindle 3, such as the steering knuckle on the axle spindle bolt 4, such as the steering swivel bolt or king-pin of the axle 5. A permanent lubrication with lubricating oil is provided for the upper bearing 1 and the lower bearing 2 of the bearing support of the axle spindle bolt 3. For this purpose, the central bore 6 is arranged in the axle spindle bolt 4 which is enlarged within the area of the upper bearing 1 into the cylindrical reservoir space 7 that is covered by a cap 8. Radial bores 9 lead from the lower area of the supply space 7 to the bearing gap 10 of the upper bearing 1. The pipe 11 is arranged at the discharge of the bore 6 in the supply space 7 as return-flow checking device which projects into the supply space 7 and terminates closely below the cap 8. The lower end of the bore 6 is connected by way of radial bores 12 with the bearing gap 13 within the upper area of the lower bearing 2.

The lower reservoir or storage space 14 is arranged within the axle spindle bolt 4 below the central bore 6; the lower reservoir space 14 is constructed cylindrically and is closed off by the sliding plate 15, the hemispherically shaped sliding bearing member 16 and the cover 17. The lubricating nipple 18 is secured at the cover 17 and the bore continuing from the lubricating nipple 18 is extended by the pipe 20 acting as return-flow checking device which projects through the bore 21 in the hemispherically shaped bearing member 16 and in the sliding plate 15 far into the supply or reservoir space 14.

During the filling of the lubricating system, the lubricating oil reaches the bore 19 by way of the lubricating nipple 18, and from there reaches the supply or reservoir space 14 by way of the tube 20.

From the reservoir space 14, the lubricating oil flows into the bore 21, from where it flows through the lubricating gap 22 between the sliding plate 15 and the slide bearing member 16 into the annular space 23 below the bearing 2. From there, the lubricating oil reaches the bearing gap 13. When the bearing gap 13 is filled, the lubricating oil flows through the radial bores 12 into the central bore 6. From the bore 6, the lubricating oil enters the tube 11 and flows into the reservoir space 7. From the reservoir space 7, it flows through the radial bores 9 into the bearing gap 10 of the upper bearing 1. If this bearing gap 10 is filled, then the lubricating oil flows into the equalization space 24 which is arranged above the reservoir space 7 and which is closed off against the outside by the rubber cap 25. The equalization space 24 serves also as control space. A bore 26 acts as excess pressure valve in the event the equalization space should be under pressure.

The lubricating oil in the reservoir space 7 and in the equalization space 24 serves for the purpose of a permanent lubrication of the upper bearing 1. Lubricating oil in the pipe 11, in the bore 6 and in the bores 12, further in the reservoir space 14 serves for the permanent lubrication of the lower bearing 2.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are within the scope of those skilled in the art.

We claim:

1. An axle spindle bearing assembly for the lubrication thereof with lubricating oil; said assembly comprising: an axle spindle bolt means having an upper and a lower bearing means, a central bore within said spindle bolt means for communicating said lower bearing means with said upper bearing means, said central bore including an enlarged upper portion forming an upper reservoir space means, an upper set of transvers bores extending from the central bore to a lower area of the upper bearing means, a lower set of transverse bores extending from the central bore to an upper area of the lower bearing means, a lower reservoir space means arranged below the bottom of the central bore, said lower reservoir space means being operatively connected with a lower area of the lower bearing means, a bore closed by a lubricating nipple leading to said lower reservoir space means, said last mentioned bore being extended by a tubular return-flow checking means projecting into the lower reservoir space means, and an equalization space arranged above the upper reservoir space means which is in communication with the upper area of the upper bearing means and which is provided with an excess pressure valve means discharging into atmosphere.

2. An axle spindle bearing assembly according to claim 1, characterized in that the equalization space is covered off by a rubber cap and that the excess pressure valve means comprises a bore in the rubber cap which opens in the presence of an excess pressure.

3. An axle spindle bearing assembly according to claim 2, characterized in that the upper reservoir space means is connected with the section of the bore means leading to the lower bearing means by way of a return-flow checking means.

4. An axle spindle bearing assembly according to claim 3, characterized in that the return-flow checking means includes a tubular means extending into the upper reservoir space means.

5. An axle spindle bearing assembly according to claim 4, characterized in that the axle spindle bolt means forms a steering knuckle pin of a steering knuckle.

6. An axle spindle bearing assembly for the lubrication thereof with lubricating oil; said assembly comprising an axle spindle bolt means having an upper and a lower bearing means, an upper reservoir space means arranged in the axle spindle bolt means for communication with the upper bearing means, lubricant connecting means having an outlet opening in the upper reservoir space means for connecting the upper reservoir space means with the lower bearing means, said lubricant connecting means including a return-flow checking means for preventing return flow of lubricating oil from the upper reservoir space means to the lower bearing means, and an equalization space arranged above the upper reservoir space means which is in communication with the upper area of the upper bearing means and which is provided with an excess pressure valve means discharging into the atmosphere.

7. An axle spindle bearing assembly according to claim 6, characterized in that the equalization space is covered off by a rubber cap and that the excess pressure valve means is constituted by a bore in the rubber cap which opens in the presence of an excess pressure.

8. An axle spindle bearing assembly according to claim 7, characterized in that the equalization space is in communication with the upper reservoir space by way of lubricating gaps adjacent the upper bearing means and radial bores leading from the upper reservoir space to the lubricating gaps.

9. An axle spindle bearing assembly for the lubrication thereof with lubricating oil; said assembly comprising an axle spindle bolt means having an upper and a lower bearing means, an upper reservoir space means arranged in the axle spindle bolt means for communication with the upper bearing means, lubricant connecting means having an outlet opening in the upper reservoir space means for connecting the upper reservoir space means with the lower bearing means, said lubricant connecting means including a return-flow checking means for preventing return flow of lubricating oil from the upper reservoir space means to the lower bearing means, a lower reservoir space means arranged within the area of the lower bearing means below the central bore, the lower reservoir space means being operatively connected with the lower area of the lower bearing means, and a bore closed by a lubricating nipple leading to said lower reservoir space means.

10. An axle spindle bearing assembly according to claim 9, characterized in that the lower reservoir space means is connected with the lower area of the lower bearing means by way of lubricating gaps.

11. An axle spindle bearing assembly according to claim 9, characterized in that the bore closed by the lubricating nipple is extended by a tubular means projecting into the lower reservoir space means as return-flow checking means.

12. An arrangement for the uniform and continuous lubrication of an axle spindle bearing assembly having upper and lower bearing means; said arrangement comprising: a lower reservoir in communication with the lower bearing means, an upper reservoir in communication with the upper bearing means, lubricant connecting means for connecting said lower reservoir to said upper reservoir, said lubricant connecting means including return flow checking means for preventing reverse flow from the upper reservoir to the lower reservoir, and a single bottom inlet in communication with the lower reservoir for supplying lubricating oil to both the upper and lower bearing means.

13. A axle spindle bearing assembly according to claim 12, characterized in that the return-flow checking means includes a tubular means extending into the upper reservoir.

14. An axle spindle bearing assembly for the lubrication thereof with lubricating oil, said assembly comprising: an axle spindle bolt means having an upper and a lower bearing means, an upper reservoir space means arranged in the axle spindle bolt means, lubricant connecting means having an outlet opening in the upper reservoir space means for connecting the upper reservoir space means with the lower bearing means, said lubricant connecting means including a return-flow checking means for preventing return flow of lubricating oil from the upper reservoir space means to the lower bearing means, and a plurality of upper transverse bores positioned below the outlet opening of the lubricant connecting means and extending from said upper reservoir space means for supplying oil to the upper bearing means.

15. An axle spindle bearing assembly according to claim 14, characterized in that said lubricant connecting means includes a central bore, said central bore being enlarged within the area of the upper bearing means to form said upper reservoir space means, said upper transverse bores communicating with a lower area of the upper bearing means, and in that a lower set of transverse bores extends from said central bore to an upper area of the lower bearing means.

16. An axle spindle bearing assembly according to claim 14, characterized in that the axle spindle bolt means forms a steering knuckle pin of a steering knuckle.

17. An axle spindle bearing assembly according to claim 15, characterized in that a lower reservoir space means is arranged within the area of the lower bearing means below the central bore, and in that the lower reservoir space means is operatively connected with the lower area of the lower bearing means, and in that a bore closed by a lubricating nipple leads to said lower reservoir space means.

18. An axle spindle bearing assembly according to claim 17, characterized in that the lower reservoir space means is connected with the lower area of the lower bearing means by way of lubricating gaps.

19. An axle spindle bearing assembly according to claim 17, characterized in that the bore closed by the lubricating nipple is extended by a tubular means projecting into the lower reservoir space means as return-flow checking means.

* * * * *